July 19, 1932. D. D. FORBES 1,868,139
APPARATUS FOR MAKING MOLDED PRODUCTS
Filed Sept. 12, 1929 3 Sheets-Sheet 3
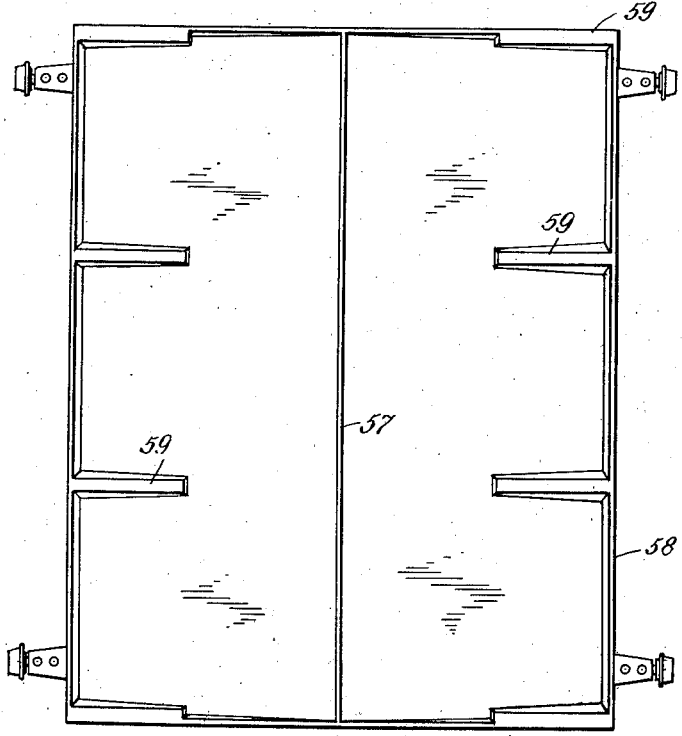
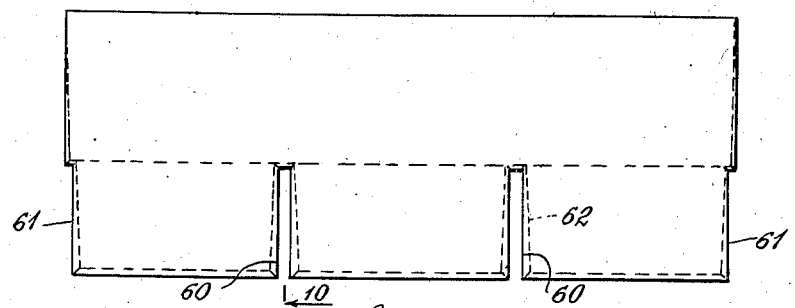
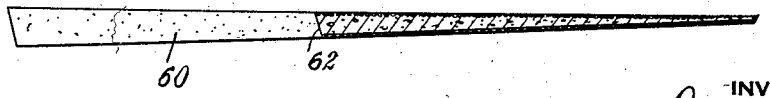
INVENTOR
Duncan D. Forbes
BY
ATTORNEYS

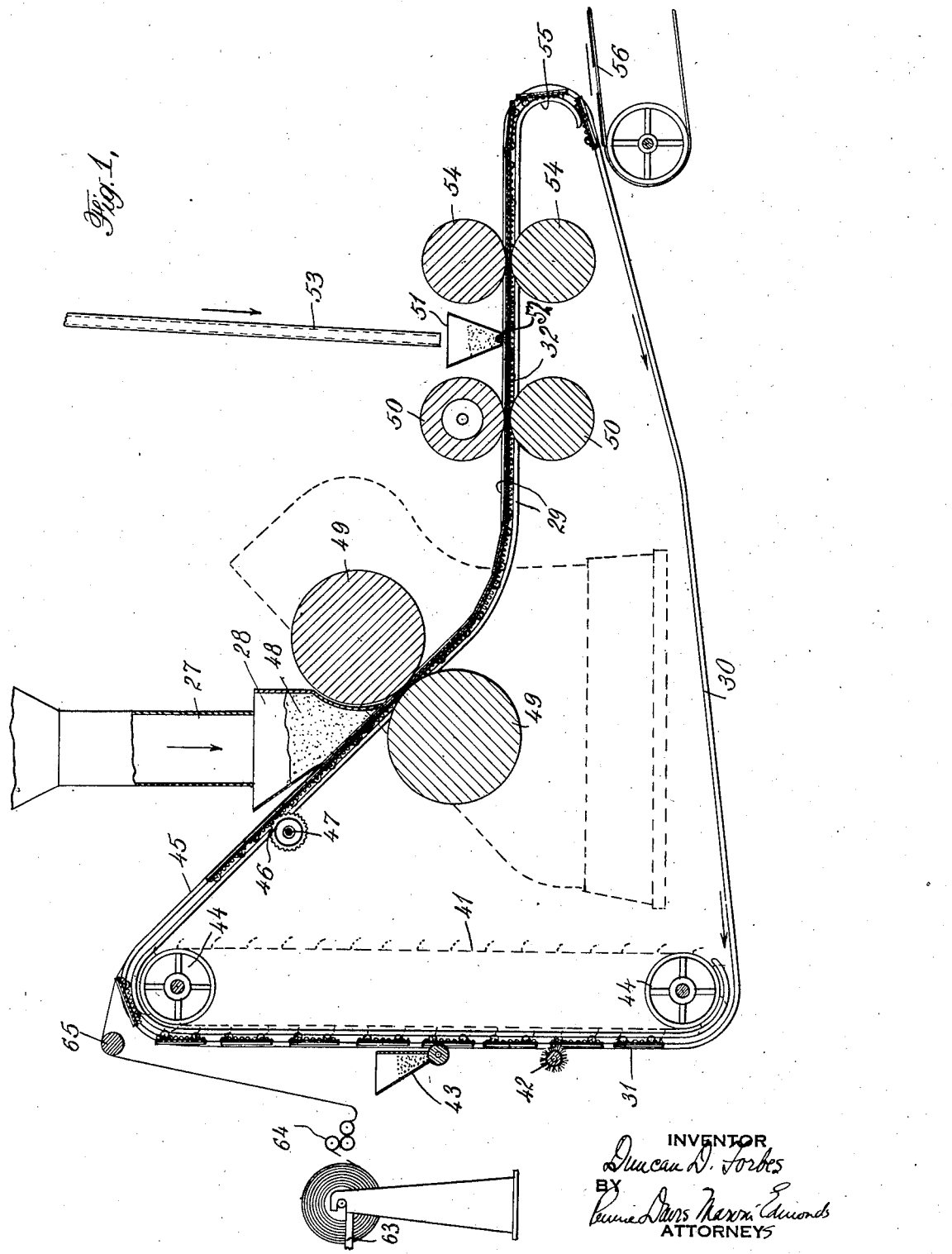

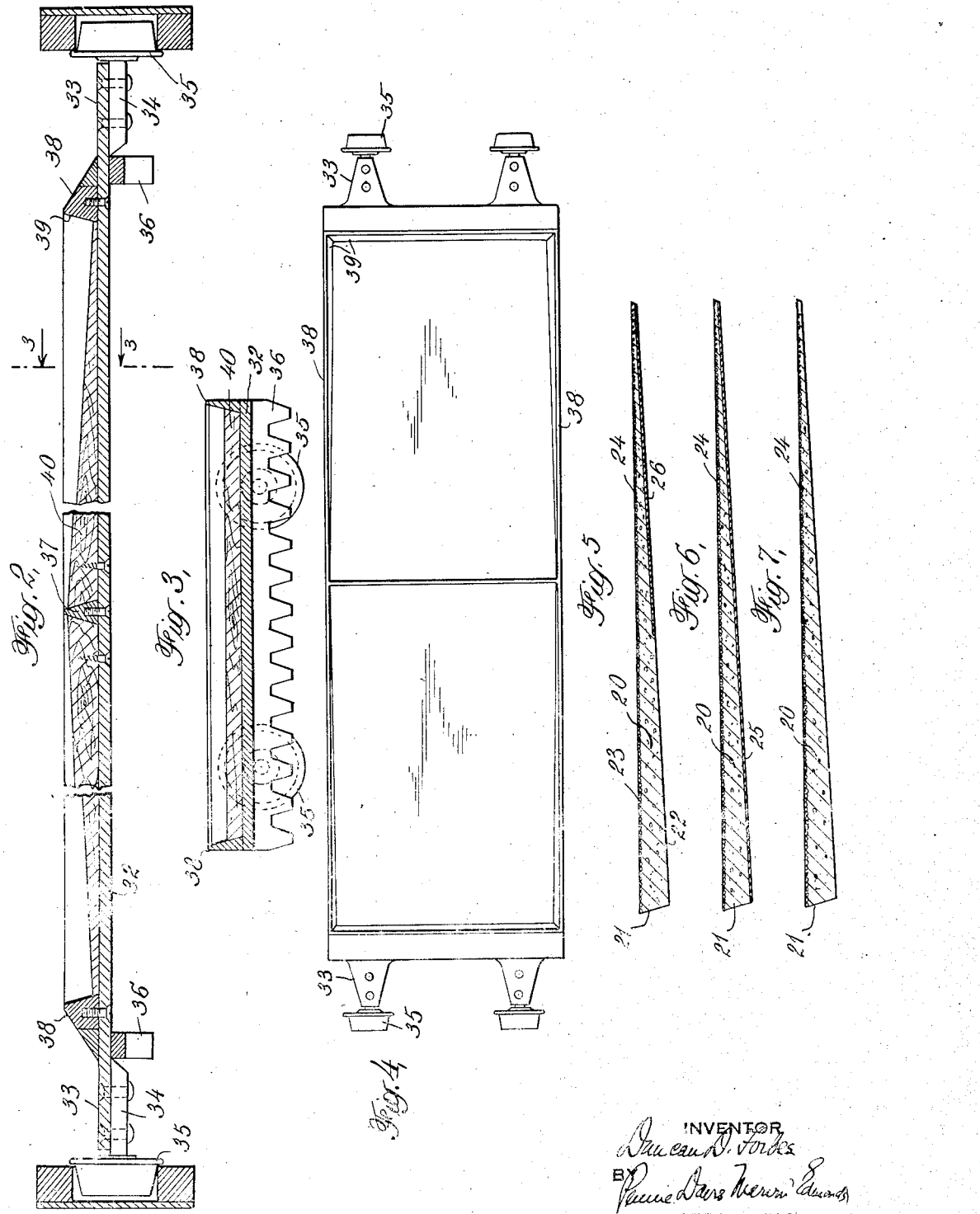

Patented July 19, 1932

1,868,139

UNITED STATES PATENT OFFICE

DUNCAN DAVIDSON FORBES, OF GLEN HEAD, NEW YORK, ASSIGNOR TO LANCASTER ASPHALT, INC., OF NEW YORK, N. Y., A CORPORATION OF DELAWARE

APPARATUS FOR MAKING MOLDED PRODUCTS

Application filed September 12, 1929. Serial No. 392,163.

This invention relates to apparatus for the manufacture of molded articles suitable for structural and other purposes and especially useful as roofing in the form of single and multiple shingles, tiles, and the like. The apparatus of the invention is adapted for the production of such articles, uniform in size, shape and quality, at a low cost and a high rate of output.

The articles to be produced in this apparatus are made of a plastic material which consists of a filler and a binder. The filler is preferably of a fibrous character with or without a small proportion of solids and may be wire grass, hay, wood pulp, chopped-up paper, or the like. The binder is preferably of bituminous material such as asphalt of a suitable melting point. This mixture is produced in any suitable or convenient manner and delivered in plastic condition to the apparatus of this invention. In that apparatus the material is molded to the desired shape and the molded articles finished by appropriate operations. In the production of shingles, the finishing operations may, for example, include the application of surfacing grit to the faces of the shingles which are to be exposed.

The apparatus consists of a plurality of mold carriages independently movable on a track, these carriages being provided with one or more mold cavities having the shape of the finished product. At one point in their travel, the carriages are engaged one at a time by suitable drive means and a series of carriages is propelled past means for introducing a quantity of the plastic material into each cavity. Thereafter the carriages pass between pressing devices which engage each carriage at top and bottom, compacting the plastic substance in the cavities and insuring that each cavity will be completely filled.

Beyond the pressing devices, the carriages pass mechanism for performing the finishing operations, after which the carriages move around a sharp curve in the track and are inverted to discharge the molded products therefrom. The carriages now travel by gravity to a low point in the track and are then engaged by conveying means and moved past a cleaning device which removes any material which may have adhered to the surfaces of the mold cavities. After being cleaned, the carriages pass a device which coats their cavity surfaces with a non-stick compound, such as talc, and the carriages are then released and allowed to travel by gravity down to the point where they are successively engaged by the device which propels them to the feeding and pressing means.

For a better understanding of the invention, reference may be had to the accompanying drawings, in which Fig. 1 is a view in side elevation of the apparatus of this invention;

Fig. 2 is a transverse section of one of the mold cavities;

Fig. 3 is a sectional view on the line 3—3 of Fig. 2;

Fig. 4 is a plan view of the carriage illustrated in Fig. 2;

Figs. 5, 6 and 7 are longitudinal sectional views of different forms of a roofing element produced in the carriage illustrated;

Fig. 8 is a plan view of a carriage for producing a different type of shingle; and Figs. 9 and 10 are top and sectional views, respectively, of a shingle produced in the carriage shown in Fig. 8, Fig. 10 being taken on the line 10—10 of Fig. 9.

Referring now to the drawings, the apparatus is illustrated in a form suitable for the production of single and multiple shingles illustrated in Figs. 5 to 7, inclusive, and 9 and 10. The single shingle shown in Figs. 5 to 7 consists of a body 20 of plastic material of appropriate dimensions. Such a shingle, for example, may be 10" wide and 16" long, while another satisfactory form is 15" wide and of the same length. These shingles are of tapering thickness from the butt end 21 to the thin end and their thickness at the butt end may vary from $\frac{1}{4}$" to $\frac{3}{4}$" while at the thin end the units are preferably $\frac{1}{8}$" thick or slightly thicker. These shingles are formed of plastic compounds of different kinds, one satisfactory substance consisting of wire grass and asphalt in equal proportions or in the proportions of 40 lbs. of wire grass to 60 lbs. of asphalt. The asphalt employed is of a suitable high melt-point so as to withstand solar heat. As illustrated, the four edges of each shingle are under-cut, so that the under surface 22 is of slightly less area than the upper surface 23. The under-cutting of the edges of the shingles facilitates the molding operations and the discharge of the molded products from the molds, and also enhances the appearance of the shingles, since the under-cut butt end casts a greater shadow than if the end were not so formed. When the shingle is laid with others in overlapping courses in the usual manner, the butt appears to be of substantially greater thickness than is actually the case, and thus improves the appearance of the roof. The upper surface of the shingle is preferably covered with a layer 24 of suitable surfacing material, such as crushed grit, crushed slate, or the like, this material being distributed over the surface and partially embedded therein in the usual way. The under surface of the shingle may be plain, as illustrated in Fig. 7, or it may have a layer 25 of thin roofing paper or the like, covering the entire under surface, as shown in Fig. 6, or only a part of the surface, as shown in Fig. 5. This layer of roofing felt or paper, which is light weight, does not add substantially to the cost of the shingle and provides substantial reinforcement therefor and serves another useful purpose in that when the shingles are nailed in place, the paper prevents distortion of the nail holes. This reinforcement is embedded in the rear face of the shingle so that the surface is smooth and the reinforcement firmly bound in position. Where the reinforcing layer covers only a part of the under surface of the shingle, as at 26, it is disposed near the thin end thereof and extends forwardly toward the butt end to a point slightly beyond the position where nails are ordinarily driven through the shingle.

The apparatus of the invention in a form suitable for producing shingles of the type illustrated is shown in Figs. 1 to 4, inclusive. This apparatus includes a discharge chute 27, to which the plastic mixture is supplied, this chute leading to a hopper 28 having an open bottom. Beneath the hopper is disposed a trackway 29. Each track is made up of pairs of rails placed an appropriate distance apart and the trackway leads through a closed path. In the lower stretch of the trackway, designated 30, each track is formed of a single rail for a purpose presently to be described. Running on the trackway are carriages 31 shown in detail in Figs. 2 to 4, inclusive. Each carriage consists of a base plate 32 of metal, projecting from the ends of which are extensions 33 carrying pins on which are mounted wheels 35. These wheels run on the trackway 29 and are held in position by the upper and lower rails of each track, as shown in Fig. 2. Near each end of the plate on the under surface thereof is a rack 36 for a purpose to be described. The carriage shown in Figs. 2 to 4 is constructed for producing a pair of shingles, and the carriage is subdivided by a transverse knife edge 37 mounted on the upper face of the plate 32 by screws or the like. Also mounted on the plate are knife edges 38 defining the side walls of the cavities, the knife edges 37 and 38 having sloping side walls, as indicated at 39. Mounted in each cavity and forming the bottom thereof is a filler block 40, held in position by screws or in any other convenient manner. The cavities defined by the knife edges and filler block will be seen to correspond to the shape of the single shingles, such as that shown in Fig. 5, for example.

The carriages are placed on the trackway in the stretch 30, from which the upper rails of each track are omitted. The carriages are disposed on this stretch in inverted position and by reason of the inclination of the stretch they run down toward the left (Fig. 1), where they are engaged by lugs on a double chain conveyor 41. The carriages are raised and moved past a driven cleaning brush 42 which cleans the mold cavities and the edges thereof. Each carriage is then moved past a device, designated 43, for the application of non-stick material, such as talc, to the faces of the mold cavities. The carriages are raised over the top of the upper sprocket wheels 44 of the conveyor and then roll by gravity down the stretch 45 of the track to pinions 46 mounted on the driven shaft 47. Each pinion is arranged to engage a rack 36 on the under surface of each carriage, and the carriage is advanced by the pinions beneath the hopper 28 in which there is maintained a supply 48 of plastic material. The material in the open bottom hopper enters the mold cavities in each carriage as the carriage is propelled beneath the hopper by engagement with carriages following it, one of which carriages is always being positively advanced by means of the pinions 46.

Just beyond the hopper are pressing rolls 49, each of which has a smooth surface. These pressing rolls lie between the two tracks of the trackway and they are spaced apart a suitable distance, so that the under roll bears against the under surface of each carriage and the upper roll bears against the knife edges which define the mold cavities on the carriage. By reason of this adjustment of the rails, excess material which has been picked up in the mold cavities is pressed back into the hopper and the plastic substance is pressed into the cavities to fill them completely and to be thoroughly compacted. Contact of the knife edges with the smooth rolls 49 gives the molded articles a clean outline.

The carriages with their charges of plastic material then issue from between the rolls 49 and move along the track to a pair of rolls 50 somewhat similar to the rolls 49. These rolls serve to smooth the plastic material in the mold cavities and the upper roll may be heated to facilitate this operation, as by means of hot fluids flowing through the upper roll 50.

Where the roofing elements thus molded are to be surfaced with grit or the like, this operation is performed by means of a grit distributing device 51 which includes a hopper and a distributing roll 52. A supply of grit is delivered to this hopper from time to time through a conveyor line 53. The grit distributed over the surface of each element in the carriages is embedded by means of rolls 54, somewhat similar in construction and operation to rolls previously described.

The carriages in the series extending from the pinions 46 to a point beyond the rolls 54 are propelled by engagement of the pinions with successive carriages in the series. Slightly beyond the rolls 54, the trackway makes a sharp turn, as indicated at 55, and the carriages are quickly inverted. In this operation, the molded products therein are discharged on a conveyor belt 56 and carried off to a point where they can be bundled or stored. The carriages now roll down the stretch of trackway 30 by gravity and in this stretch each track is made up of a single rail so that the carriages may be readily removed therefrom when a change in the character of the products is to be made. For this purpose, it is simply necessary to substitute a different type of carriage for that previously in use. The carriages are passed to the bottom of the conveyor chains 41 and they are picked up and the cycle of operations repeated.

Where it is desired to produce so-called strip shingles, carriages of the type shown in Fig. 8 are employed. Such a carriage has a central knife edge 57 and knife edges 58 around the outline of the carriage. The knife edges 58 are provided with extensions 59 to form the usual cut-outs 60 with which such shingles are ordinarily provided. The side walls of the various knife edges and extensions are inclined in the manner illustrated, so that the side edges of each shingle are under-cut, as illustrated at 61, the side walls of the cut-outs also being under-cut, as illustrated at 62.

Where shingles are to be provided with a reinforcing material, the apparatus includes a support 63 having a reel of paper or other reinforcing material, the web being drawn from the supply by driven rolls 64 and passed up over a guide roll 65. The web is properly centered over the carriages moving through the stretch 45 of the trackway and lies at the bottom of the mold cavities in the carriages as these carriages pass beneath the hopper 28. The plastic material is thus discharged on the top face of the web and the web is firmly affixed to the products molded by the devices mentioned.

The knife edges on the carriages cooperating with the presser rolls serve to sever the reinforcing material or else to score it so deeply that separation of the individual units is readily accomplished. When the reinforcing is to cover the entire under surface of each shingle, as in the form shown in Fig. 6, the web of paper or felt is wide enough to cover the full width of each carriage. Where the reinforcement is to cover only a part of the under surface of each shingle, as at Fig. 5, a narrow web of reinforcement is employed and it is guided so as to be centered above the central knife edge 37 or 57 of each carriage.

It will be seen that in the apparatus described, the carriages, while moved through the filling and molding devices in a continuous series, are in fact independent of one another, so that less carriages are required to maintain the desired output than would be the case if the carriages were connected together by chains or the like. Also, with the present arrangement the carriages may be removed from the track and replaced by others for making different products without interrupting the operation of the apparatus. The carriages being independently movable, align themselves properly in their movement through the feeding and pressing devices and the apparatus accordingly produces a succession of perfect products. Also since the carriages pass through the filling and pressing devices with their ends in intimate contact, the plastic material cannot be forced between the carriages and there is no loss thereof during the operation of the device. If the carriages were connected together by chains or the like, the connecting means would either stretch or become worn in the course of time so that the carriages would separate to a greater or less degree. This would lead to plastic material being forced between the carriages and would require the apparatus to be frequently cleaned, as well as resulting in a waste of plastic material. With the present arrangement, a continuous succession of perfect products is produced.

By provision of upper and lower pressing rolls to support the carriages during the actual molding operation, the trackway used may be of relatively light construction, since it has to support no weight other than that of the carriages themselves. At the same time, the carriages are firmly held during the application of pressure and each cavity in the carriage receives its full supply of plastic compound and this material properly is compacted and pressed to final form.

What I claim:

1. Apparatus for producing molded articles which comprises the combination of a trackway, a mold having supporting wheels running between upper and lower rails of spaced tracks forming the said trackway, means for introducing plastic material into said mold, and rotary elements between which said mold passes, said elements pressing the material in said mold and engaging the top and bottom of said mold.

2. Apparatus for producing molded articles which comprises the combination of a trackway, a mold having supporting wheels movable on said trackway, means for introducing plastic material into said mold during its movement on said trackway, and pressing rolls engaging the top and bottom of the mold as it moves along said trackway and compacting the material therein.

3. Apparatus for producing molded articles which comprises the combination of a trackway, a mold having supporting wheels movable on said trackway, means for introducing plastic material into said mold during its movement on said trackway, pressing rolls engaging the top and bottom of the mold between said wheels and compacting the material therein, means for distributing surfacing material on the face of the compacted material in the mold and means for partially embedding said surfacing material.

4. Apparatus for producing molded articles which comprises the combination of a trackway, a mold having supporting wheels beyond its ends movable on said trackway, means for positively advancing said mold through a portion of said trackway, means for supplying plastic material to said mold during its movement, and means engaging the top and bottom of the mold between said wheels and compacting the material in the mold.

5. Apparatus for producing molded articles which comprises the combination of a trackway, a plurality of molds, each having supporting wheels movable on said trackway, means for engaging the molds one at a time and advancing them in a row, means for supplying plastic material to said molds successively, and means engaging said molds successively and compacting the material therein, said means including rotary members engaging the top and bottom of each mold between its wheels.

6. Apparatus for producing molded articles which comprises the combination of a trackway including tracks transversely spaced apart, a mold movable along the trackway, means for advancing the mold, means for introducing plastic material into the mold, and pressing rolls between which said mold passes, said rolls lying between said tracks and engaging the mold on opposite faces to compact the material carried thereby.

7. Apparatus for producing molded articles which comprises the combination of a trackway including tracks transversely spaced apart, a mold movable along the trackway, means for introducing plastic material into the mold, rotating pressing rolls between which said mold passes, said rolls lying between said tracks and engaging the mold on opposite faces to compact the material carried thereby, and means for advancing the mold to the rolls at a speed substantially the same as the surface speed of the latter.

8. Apparatus for producing molded articles which comprises the combination of a trackway, a mold having supporting rollers movable along the trackway and having a mold cavity in its upper surface, means for introducing plastic material into said cavity, and a pair of rolls engaging the mold at top and bottom and between the tracks of said trackway, said rolls compacting the material in said cavity.

9. In apparatus for making molded articles, the combination of a trackway having spaced rails, and a mold carriage having wheels at opposite sides running on said rails, said carriage including a cavity defined at least in part by knife-edges and a filler block occupying the bottom of the cavity.

10. In apparatus for making molded articles, the combination of a trackway having spaced rails, and a mold carriage having wheels at opposite sides running on said rails, said carriage comprising a plate, removable knife edges secured to said plate and at least in part defining a mold cavity, and a filler block attached to said plate and forming the bottom of said cavity.

11. In apparatus for making molded articles, the combination of a trackway having spaced rails, and a mold carriage having wheels at opposite sides running on said rails, said carriage comprising a plate, removable knife edges on one face of the plate along the edges thereof, a central knife edge extending transversely of said plate and sub-dividing said plate into a pair of mold cavities, and filler blocks forming the bottoms of said cavities.

12. In apparatus for making molded articles, the combination of a trackway having spaced rails, and a mold carriage having wheels at opposite sides running on said rails, said carriage comprising a plate, removable knife edges on one face of the plate along the edges thereof, a central knife edge extending transversely of said plate and with said other knife edges defining a pair of mold cavities, and a filler block in each cavity, each block having a tapering thickness from one end to the other and the blocks being disposed in the cavities with their thick ends adjacent.

13. In apparatus for making molded articles, the combination of a mold carriage having a mold cavity on one face and supporting rollers at its ends, and a pair of pressing rolls spaced to permit the carriage to pass between them, the rolls engaging the carriage on opposite faces between said rollers.

14. In apparatus for making molded articles, the combination of a mold carriage comprising a plate having members on one face at least in part defining a cavity, wheels attached to the carriage at opposite ends thereof, a pair of pressing rolls spaced to permit the carriage to pass between them and engaging the plate and members in such movement, said rolls being shorter than the distance between the wheels at opposite ends of the carriage, and rails along which said carriage moves on its wheels, said rails lying beyond the ends of said rolls.

15. In apparatus for making molded articles, the combination of spaced rails forming a closed trackway, a plurality of mold carriages each having supporting wheels running on said rails, said carriages being independent of one another, a pair of pressing rolls spaced to permit said carriages to pass between them with said rolls engaging said carriages on opposite faces between said wheels, and means engaging the carriages one at a time for advancing the carriages in a row between said rolls.

16. In apparatus for making molded articles, the combination of a trackway, and a mold carriage having supporting wheels running on the trackway, this carriage including a plate having upwardly extending knife edges along its side edges.

17. In apparatus for making molded articles, the combination of a trackway made up of a pair of spaced rails, and a mold carriage having supporting wheels running on said rails, this carriage having a flat under surface, and being provided with knife edges projecting upwardly from its top surface along its side edges.

18. In apparatus for making molded articles, the combination of a trackway made up of spaced rails, a mold carriage having supporting wheels movable on this trackway, means engaging the carriage on its under surface adjacent one end for moving it, and pressing rolls engaging the top and bottom of the carriage at one side of the point of engagement of the moving means with the carriage.

19. In apparatus for making molded articles, the combination of a trackway including spaced rails, a mold carriage having supporting wheels movable on said rails, said carriage being provided with a projecting member on its under surface, means engaging said member for moving the carriage, and pressing rolls engaging the top and bottom of the carriage, the bottom roll engaging the carriage at one side of said member.

20. In apparatus for making molded articles, the combination of a trackway including spaced rails, a mold carraige having supporting wheels movable on said rails, said carriage being provided with projecting members on its under surface, means engaging said members for moving the carriage, and pressing rolls lying between said rails and engaging the top and bottom of the carriage, the bottom roll being shorter than the distance between said members.

21. In apparatus for making molded articles, the combination of a trackway including spaced tracks, each formed of upper and lower vertically-spaced rails, a mold carriage having supporting wheels movable on said tracks, said carriage carrying a rack, and a driven pinion engageable with the rack to advance the carriage.

22. In apparatus for making molded articles, the combination of a trackway, a mold carriage having supporting wheels movable on said trackway, means engaging the carriage to advance it, and pressing elements engaging the top and bottom of the carriage at one side of the point of engagement of said advancing means with the carriage.

23. In apparatus for making molded articles, the combination of a trackway including spaced rails, a series of mold carriages movable on the trackway, means at one point in the path of travel of the carriages for engaging the carriages successively and advancing them, and pressing rolls engaging the carriages at top and bottom and lying spaced inwardly from said rails.

24. In apparatus for making molded articles the combination of a trackway, a mold carriage movable along the trackway and provided with knife edges along its side edges, and a filler block between said knife edges and providing the bottom of a mold, and means for advancing the carriages.

25. In apparatus for making molded articles, the combination of a trackway, and a mold carriage having supporting wheels movable on the trackway, this carriage including a plate having upwardly-tapering margins forming knife edges.

26. Apparatus for making molded articles which comprises the combination of a trackway, a mold having its marginal portions forming knife edges and having supporting wheels movable on said trackway, means for introducing plastic material into the said mold during its movement on said trackway, pressing rolls adapted to engage the portions of the top and bottom of the mold between said wheels and adapted to compact the material therein, means for supplying heat to that pressing roll which is adapted to engage the top of the mold, means for distributing surfacing material upon the face of the compacted material in the mold, and means for partially embedding the said surfacing material in the compacted plastic material in the mold.

27. Apparatus for making a succession of molded articles which comprises the combination of a trackway, a plurality of molds having supporting wheels movable on said trackway, means for moving an endless web of fibrous material along a selected portion of the said trackway, while supported upon a succession of the said molds, means for introducing plastic material into the said molds and upon the endless web during the said movement along the trackway, pressing rolls adapted to engage the top and bottom of each mold between the said wheels and to compact and shape the plastic material in the mold, and tapered knife-edge margins formed on each of the molds and adapted to cooperate with the said pressing rolls for severing from the continuous web the molded article lying within each mold.

28. Apparatus for making a succession of molded articles which comprises the combination of a trackway, a plurality of molds having supporting wheels movable on said trackway, means for moving an endless web of fibrous material along a selected portion of the said trackway while supported upon a succession of the said molds, means for introducing plastic material into the said molds and upon the endless web during the said movement along the trackway, pressing rolls adapted to engage the top and bottom of each mold between the said wheels and to compact and shape the plastic material in the mold, tapered knife-edge margins formed on each of the molds and adapted to cooperate with the said pressing rolls for severing from the continuous web the molded article lying within each mold, means for distributing surfacing material upon the face of the compacted material in the mold, and means for partially embedding the said surfacing material in the compacted material.

In testimony whereof I affix my signature.

DUNCAN DAVIDSON FORBES.